United States Patent [19]

Denton

[11] Patent Number: 4,762,367
[45] Date of Patent: Aug. 9, 1988

[54] VEHICLE HEADREST

[75] Inventor: Gary G. Denton, Wickford, England

[73] Assignee: General Motors Corporation, Detroit, Mich.

[21] Appl. No.: 6,791

[22] Filed: Jan. 27, 1987

[30] Foreign Application Priority Data

Sep. 4, 1986 [GB] United Kingdom ............... 8621362

[51] Int. Cl.⁴ ............................................. A47C 7/36
[52] U.S. Cl. .................................. 297/409; 297/284; 297/391
[58] Field of Search .............. 297/284, 391, 406, 408, 297/409

[56] References Cited

U.S. PATENT DOCUMENTS

| 2,434,007 | 1/1948 | O'Dea | 297/409 X |
| 3,307,874 | 3/1967 | Wilson | 297/408 |
| 3,603,642 | 9/1971 | Loessker | 297/408 |
| 4,540,217 | 9/1985 | Suzuki | 297/391 |
| 4,657,304 | 4/1987 | Heesch et al. | 297/409 X |

FOREIGN PATENT DOCUMENTS

| 2405725 | 1/1976 | Fed. Rep. of Germany | 297/408 |
| 943124 | 11/1963 | United Kingdom | 297/284 |

Primary Examiner—Kenneth J. Dorner
Assistant Examiner—Peter R. Brown
Attorney, Agent, or Firm—Ernest E. Helms

[57] ABSTRACT

The present invention provides a vehicle seat headrest which by rotation of a handle can be extended or retracted in a generally horizontal plane. A preferred embodiment of the present invention also allows for adjustment of the tilt of the headrest.

10 Claims, 2 Drawing Sheets

VEHICLE HEADREST

FIELD OF THE INVENTION

The field of the present invention is that of vehicle seat headrests or restraints. More particularly, the field of the present invention relates to vehicle seat headrests which are adjustable in a generally horizontal plane.

DISCLOSURE STATEMENT

The use of headrests in automotive vehicles is well known. Many prior headrests are connected with the vehicle seat via a straight post member. An example of a headrest with a straight post is shown and illustrated in U.S. Pat. No. 3,537,750 to Lohr, commonly assigned. The post is vertically adjustably inserted into the vehicle seat. Since vehicle seats are slightly inclined rearward, this often causes the vehicle seat headrest to be further rearward than what is desired for the vehicle seat occupant's comfort. Therefore, it is desirable to provide a vehicle seat headrest which may be horizontally adjusted to a desired position as determined by the vehicle seat occupant.

Other headrests have attempted to address the above-noted problem by providing a headrest which can tilt angularly outward toward the seat occupant such as U.S. Pat. No. 3,537,749 to Putsch et al. Still other headrests provide a curved post such as U.S. Pat. No. 3,608,935 to Cziptschirsch so that the headrest moves toward the seat occupant as the headrest is pulled upwardly. However, neither of the above described approaches provides a headrest with the degree of selectivity which is optimum for the vehicle seat occupant's comfort. Therefore, it is desirable to provide a horizontally adjustable headrest whose horizontal position is totally independent of the tilt of the headrest or the vertical position of the headrest.

SUMMARY OF THE INVENTION

To overcome the above-noted and other problems the present invention is brought forth. The present invention provides a vehicle seat headrest which is horizontally adjustable. The present invention provides a cushion support which is pivotally connected by two links which in turn are pivotally connected to a worm gear. Rotation of the worm gear by the seat occupant allows the headrest to be infinitely adjusted horizontally within a predetermined range. A preferred embodiment of the invention also allows the headrest to have an adjustable tilt in addition to its horizontal adjustment further maximizing vehicle seat occupant comfort.

It is an object of the present invention to provide a horizontally adjustable vehicle seat headrest. It is another object of the present invention to provide a method of adjusting the seat headrest of a motor vehicle. It is also the object of the present invention in a preferred embodiment to provide a horizontally adjustable vehicle seat headrest which may also be angularly adjusted.

It is another object of the present invention to provide a vehicle seat headrest including a frame to attach the headrest to the seat, a cushion support, a first link pivotally and slottably connected to the cushion support and pivotally connected to the frame along the opposite ends of the first link, a second link having a first end pivotally connected with the seat cushion support, a worm gear rotatably mounted to the frame with handles at both ends and being pivotally connected with the first and second links along two axes and being threadably engaged with the second link whereby rotation of said worm gear along its rotational axis causes the end of the second link threadably engaged with the worm gear to translate linearly with respect to the first link end pivotally connected with the frame and rotation of the worm gear also causes the cushion support to be translated with respect to the frame, and a ratchet member to determine the angular orientation of the cushion support with respect to the frame independent of the rotation of the worm gear.

It is yet another object of the present invention to provide a method for adjusting the position of a vehicle headrest which includes a cushion support, first and second links, a frame and worm gear, the method including pivotally connecting the cushion support with the first and second links, pivotally connecting the first and second links with the frame, threading an end of one of the links with a worm gear which is rotatably mounted to the frame, rotating the worm gear to translate the end of the links pivotally connecting to the frame with respect to one another whereby the cushion support is translated with respect to the frame.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
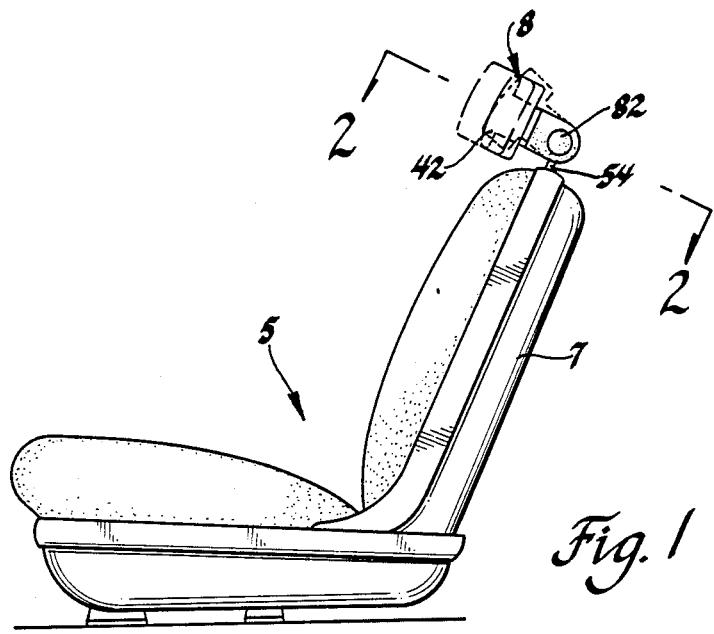
FIG. 1 is a side view of a preferred embodiment of a vehicle seat headrest of the present invention.
Figure 2:
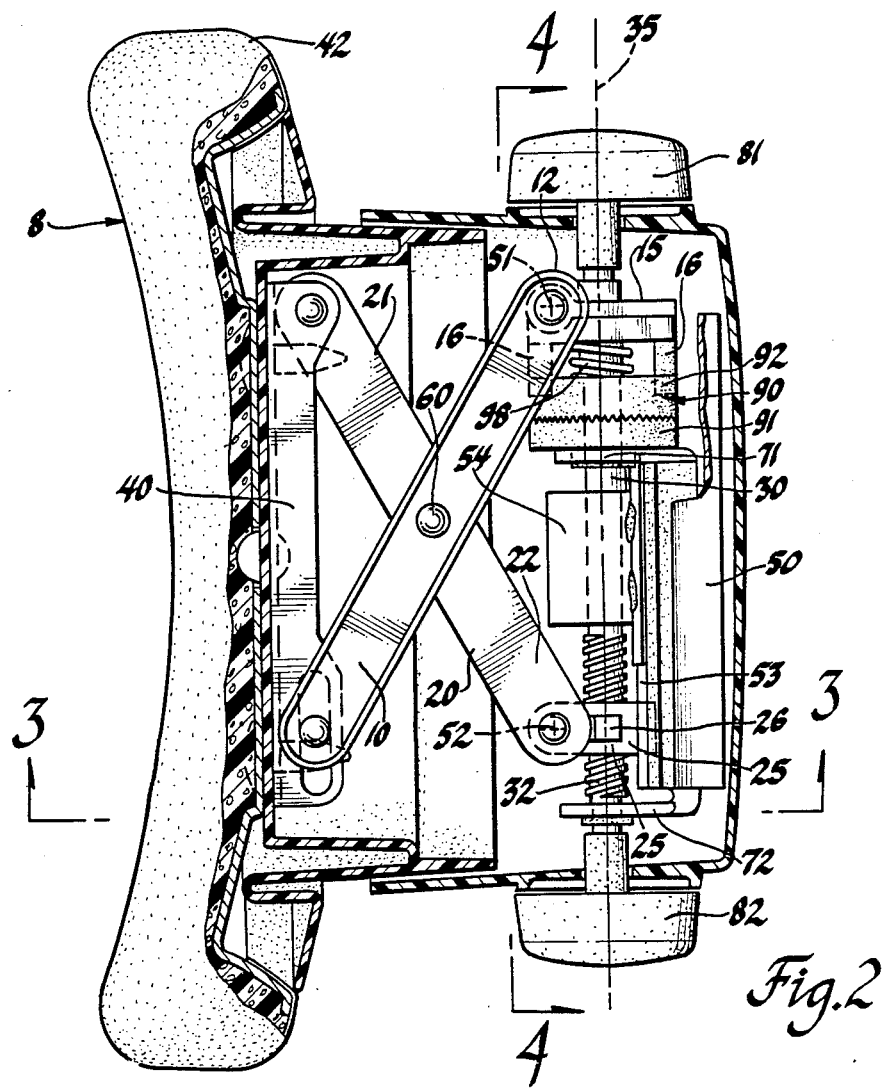
FIG. 2 is a sectional view taken along line 2—2 of FIG. 1.
Figure 3:
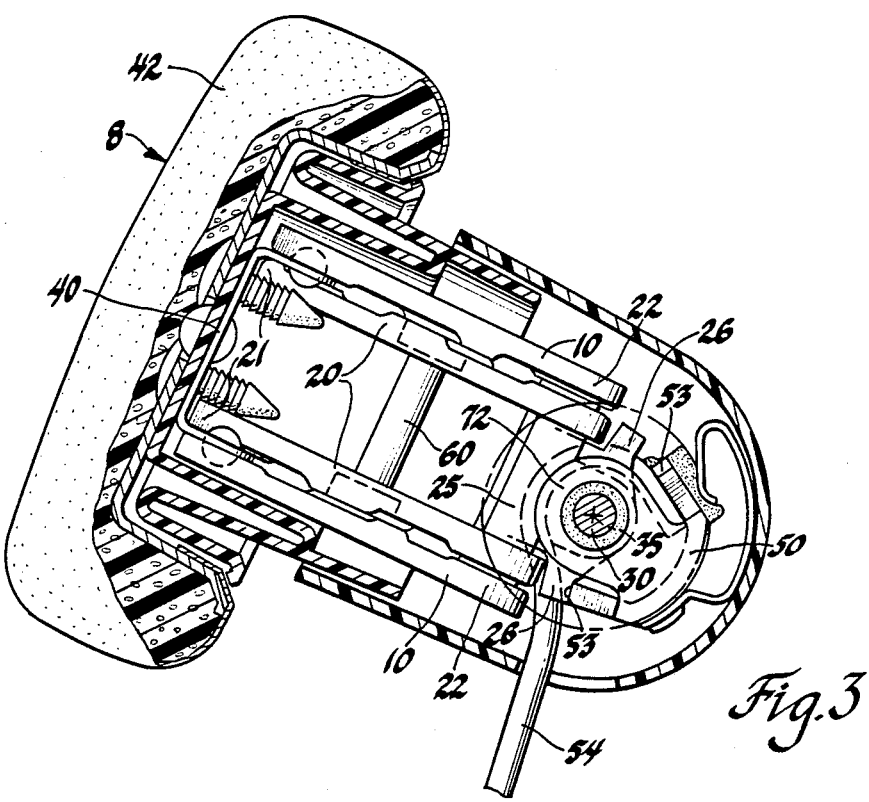
FIG. 3 is a sectional view taken along line 3—3 of FIG. 2.
Figure 4:
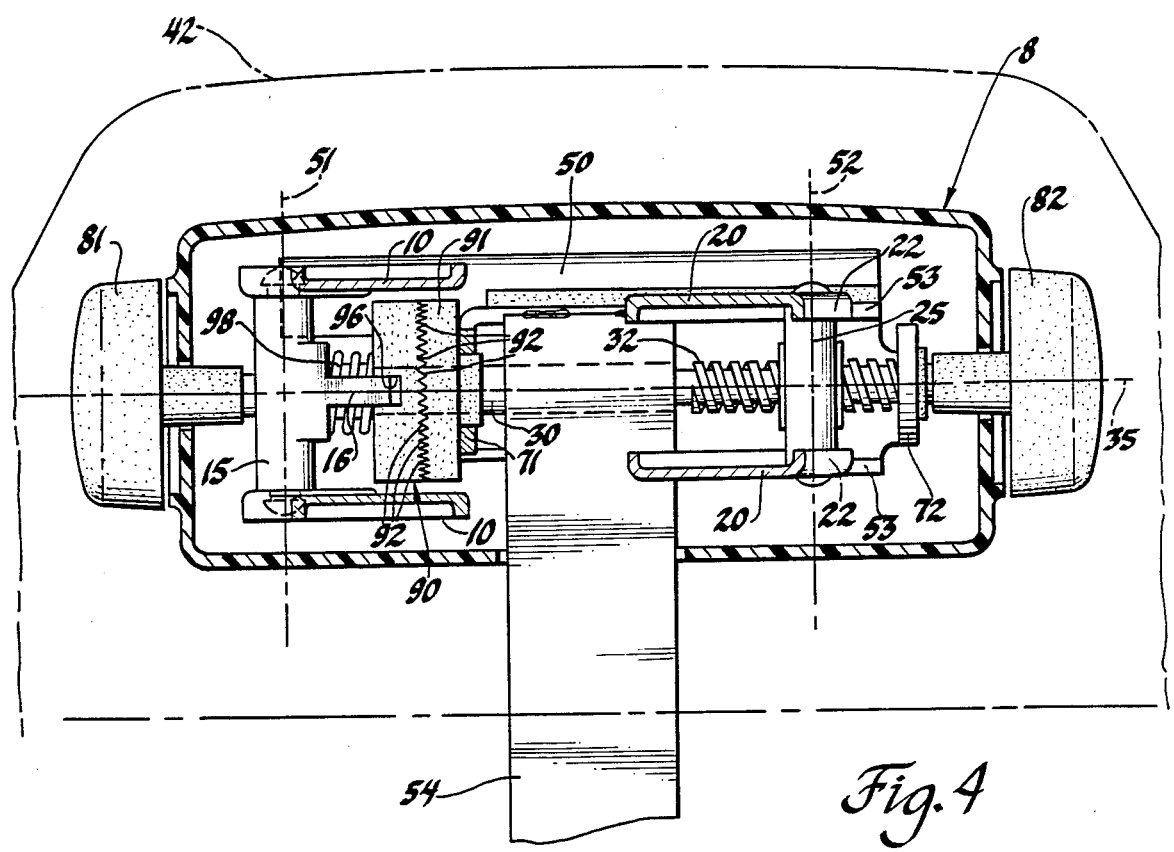
FIG. 4 is a sectional view taken along line 4—4 of FIG. 2.

Referring to FIG. 1, the vehicle seat 5 has a vertical slightly inclined seat back 7. Projecting up from the seat back 7 is the vehicle seat headrest 8. The vehicle headrest 8 has a frame 50 with a post 54 allowing the headrest 8 to be attached to the seat back 7 in a conventionally vertically adjustable manner. Referring to FIGS. 2, 3, and 4, the vehicle seat headrest 8 has a cushion 42 surrounding a cushion support 40. The cushion support 40 is pivotally and slidably connected (via a pin and slot arrangement) with an upper and lower first link 10. Crossing the upper and lower first links 10 are the upper and lower second links 20. The upper and lower second links 20 are also pivotally connected at their first ends 21 with the cushion support 40.

Between their respective ends and adjacent their midpoints the upper and lower first 10 and second 20 links are pivotally connected by a pin 60. The first links 10 along their ends opposite the cushion support 40 are pivotally connected with the frame 50 via a first mounting plate 15 along pivotal axis 51. The second link along an end 22 opposite their first ends 21 are also pivotally connected with the frame 50 via a second mounting plate 25 along pivotal axis 52.

Rotatably mounted to first 71 and second 72 flanges of the frame 50 is a shaft sometimes referred to as the worm gear 30. The horizontally oriented worm gear 30 is basically comprised of a shaft having handles 81 and 82 on the sides and a threaded portion 32 at one end. The worm gear 30 is threadably engaged with the second links 20 via the second mounting plate 25. The first 10 and second 20 links via their respective mounting plates 15 and 25 have a fixed pivotal axis 35 coaxial with the rotational axis of the worm gear 30. Rotation of the worm gear 30 (by handles 81 or 82) causes the end 22 (FIG. 2) of the second link 20, threadably engaged to the worm gear 30, to translate linearly with respect to the end 12 of the first link 10. End 12 is pivotally connected with and adjacent to the frame 50 via mounting plate 15. End 12 of the first link via mounting plate 15 is axially fixed with respect to the worm gear rotational axis 35 by a washer (not shown) which prevents mounting plate 15 from moving axially along worm gear 30.

Providing the means for adjustably determining the angular orientation of the cushion support 40 with the frame 50 along pivotal axis 35 is ratchet clutch 90. The ratchet clutch 90 includes a first clutch plate 91, through which the worm gear 30 extends. The first clutch plate 91 is angularly fixed with respect to the frame 50. The ratchet clutch 90 also includes a second clutch plate 92 which has an angular fixed orientation with respect to the angular orientation of the cushion support 40. The worm gear 30 also extends through the second clutch plate 92. The second clutch plate 92 is clutch plate. A projecting male member of the first mounting plate fits within grooves 96 of the second clutch plate 92. The second clutch plate 92 can be angularly displaced on worm gear 30 and angular shifts in the cushion support 40 are reflected by the second clutch plate 92 via male member 16. As mentioned previously, a washer (not shown) fixably mounted on the worm gear 30 retains the first mounting plate 15. Therefore, the spring 98 is captured between the first mounting plate 15 and the second clutch plate 92. The clutch plates 91 and 92 have the series of serrations or teeth 92 to allow the tilt adjustment of cushion support 40 to be incremental.

Handles 81 and 82 are provided on both sides of headrests so that the headrest may be easily adjusted by seat occupants who are left or right handed. The rotation of the worm gear 30 causes the second mounting plate 25 to be moved axially with respect to the worm gear 30 along threaded portion 32 thereby causing the cushion support 40 to be translated in a fixed plane with respect to the frame 50 to a new desired position. There is enough frictional engagement between second mounting plate 25 and worm gear 30 such that the cushion support 40 will be retained in the desired set position after the release of handle 81 or 82.

When it is desired to change the tilt of the headrest, the headrest may simply be grabbed and be pushed upwardly or downwardly. This will cause the ratchet clutch 90 to shift incrementally, setting the headrest to its new desired angular position independent of the rotation or rotational position of worm gear 30. The second mounting plate 25 has projecting male stud members 26 which by contacting the contact surface 53 of the frame limits the angular adjustment of the cushion support 40.

The present invention provides a method for adjusting the position of a vehicle headrest 8 which includes a cushion support 40, first 10 and second 20 links, a frame 50 and a worm gear 30, the method includes the following steps:

(1) Pivotally connecting the cushion support 40 with the first 10 and second 20 links;

(2) Pivotally connecting the first 10 and second 20 links with a headrest frame 50;

(3) Threading an end of one of the links with the worm gear 30 which is rotatably mounted to the frame; and (4) Rotating the worm gear 30 to translate the end of the links pivotally connecting to the frame 50 with respect to one another whereby the cushion support 40 is translated with respect to the frame 50.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat headrest, said headrest in combination comprising:

a frame to attach said headrest to said seat;

a cushion support;

a first link pivotally connected to said cushion support and said frame along the opposite ends of said first link;

a second link pivotally connected with said cushion support along a first end;

a shaft rotatively mounted to said frame said shaft having a threaded portion threadably engaged and pivotally connected with an end of said second link opposite said first end of said second link whereby rotation of said shaft causes said end of said second link threadably engaged with said shaft to translate linearly with respect to said end of said first link pivotally connected to said frame and rotation of said shaft causes said cushion support to be translated in a plane fixed with respect of said frame; and means for adjusting the angular orientation of said first and second links and said cushion support with respect to said frame along a fixed pivotal axis, said adjusting means including a first clutch plate through which said shaft extends angularly fixed with respect to said frame and a second clutch plate through which said shaft extends angularly fixed with respect to said first and second links and said cushion support for rotational movement therewith, and a spring for biasing said first and second clutch plates together for engagement whereby the angular orientation of said cushion support can be set.

2. A vehicle seat headrest as described in claim 1 wherein said shaft has an axis and said end of said first link pivotally connected to said frame is fixed with respect to the axis of said shaft.

3. A vehicle seat headrest as described in claim 1 wherein said first and second links are pivotally connected between said frame and said cushion support and one of said links is slottably connected with said cushion support.

4. A vehicle seat headrest as described in claim 1 wherein there are upper and lower first and second links.

5. A vehicle seat headrest as described in claim 1 wherein said shaft is oriented generally horizontally.

6. A vehicle seat headrest, said headrest comprising, in combination:
a frame to attach said headrest to said seat; a cushion support;
upper and lower first links pivotally and slottably connected with said cushion support and being pivotally connected to said frame along the opposite ends of said first links;
upper and lower second links pivotally connected with said cushion support at a first end of said second link and said second links being pivotally connected with said upper and lower first links respectively;
a shaft with a threaded portion, said shaft being rotatably mounted to said frame threadably engaged and pivotally connected with the end of said second links opposite said first end of said second links whereby rotation of said shaft causes said ends of said second links threadably engaged with said shaft to translate linearly with respect to said end of said first links pivotally connected with said frame and rotation of said shaft also causes said cushion support to be translated in a plane fixed with respect to same frame; and
means for adjusting the angular orientation of said first and second links and said cushion support with respect to said frame along a fixed pivotal axis, said adjusting means including a first clutch plate through which said shaft extends angularly fixed with respect to said frame and a second clutch plate through which said shaft extends angularly fixed with respect to said first and second links and said cushion support for rotational movement therewith, and a spring for biasing said first and second clutch plate together for engagement whereby the angular orientation of said cushion support can be set.

7. A vehicle seat headrest as described in claim 6 where said worm gear has a rotational axis and the pivotal axis of said cushion support if colinear with the rotational axis of said worm gear.

8. A vehicle seat headrest, said headrest comprising, in combination:
a frame to attach said headrest to said seat;
a cushion support;
a first link pivotally and slottably connected to said cushion support and pivotally connected to said frame along the opposite ends of said first link;
a second link having a first end pivotally connected with said cushion support;
a shaft rotatably mounted to said frame and pivotally connected with said first and second links along two axes and said shaft having a worm gear threadably engaged with said second link whereby rotation of said worm gear along its rotational axis causes the end of said second link threadably engaged with said worm gear to translate linearly with respect to said first link end pivotally connected with said frame and rotation of said worm gear also causes said cushion support to be translated in a plane fixed with respect to said frame; and
a ratchet member said ratchet member including a first clutch plate through which said shaft extends fixed to said frame and a second clutch plate through which said shaft extends angularly fixed with respect to said first and second links and said cushion support for rotational movement therewith, and
a spring for biasing said second clutch plate toward engagement with said first clutch plate whereby the angular orientation of said cushion support with respect to said frame is set independent of the rotation of said worm gear.

9. A vehicle seat headrest as described in claim 8 further including handles at both ends of said shaft.

10. A method for adjusting the position of a vehicle seat headrest which includes a cushion support, first and second links, a frame and worm gear, said method, in combination, comprising:
pivotally connecting said cushion support with said first and second links;
pivotally connecting the first and second links with said frame and with one another adjacent their midpoints;
threading an end of one of said links with a thread portion of a shaft which is rotatably mounted to said frame;
rotating said shaft to translate the end of said links pivotally connecting to said frame with respect to one another whereby said cushion support is translated with respect to said frame; and
adjustably determining the angular orientation of said cushion support with respect to said frame by extending said shaft through a first clutch plate angularly fixed with said frame, and extending said shaft through a second clutch plate angularly fixed with respect to said first and second links and said cushion support and rotatably therewith and spring biasing said first and second clutch plates together.

* * * * *